United States Patent
Discekici et al.

(10) Patent No.: US 12,472,687 B2
(45) Date of Patent: Nov. 18, 2025

(54) THREE-DIMENSIONAL PRINTING

(71) Applicant: PERIDOT PRINT LLC, Palo Alto, CA (US)

(72) Inventors: Emre Hiro Discekici, San Diego, CA (US); Carolin Fleischmann, San Diego, CA (US); Shannon Reuben Woodruff, San Diego, CA (US); Alay Yemane, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 101 days.

(21) Appl. No.: 18/009,913

(22) PCT Filed: Jul. 20, 2020

(86) PCT No.: PCT/US2020/042737
§ 371 (c)(1),
(2) Date: Dec. 12, 2022

(87) PCT Pub. No.: WO2022/019876
PCT Pub. Date: Jan. 27, 2022

(65) Prior Publication Data
US 2023/0234284 A1    Jul. 27, 2023

(51) Int. Cl.
*B33Y 70/10* (2020.01)
*B29C 64/165* (2017.01)
(Continued)

(52) U.S. Cl.
CPC ............ *B29C 64/165* (2017.08); *B33Y 70/10* (2020.01); *B29K 2067/00* (2013.01);
(Continued)

(58) Field of Classification Search
CPC ........ B29K 2067/043; B29K 2067/046; B29K 2077/00; B29K 2105/088;
(Continued)

(56) References Cited

U.S. PATENT DOCUMENTS

| 9,908,978 B2 | 3/2018 | Reese et al. | |
| 2010/0096596 A1* | 4/2010 | Lewis | B33Y 70/00 252/500 |

(Continued)

FOREIGN PATENT DOCUMENTS

| CN | 110240799 A  * | 9/2019 | ............. B33Y 70/00 |
| JP | 2016-150530 A | 8/2016 | |

(Continued)

OTHER PUBLICATIONS

Translation of CN 110240799 A (published on Sep. 17, 2019).*

*Primary Examiner* — Leo B Tentoni
(74) *Attorney, Agent, or Firm* — Dierker & Kavanaugh, P.C.

(57) ABSTRACT

An example of a three-dimensional (3D) build material composition includes from about 70 wt % to about 95 wt % of polyamide particles, based upon a total weight of the build material composition; and from about 5 wt % to about 30 wt % of biodegradable polyester filler particles, based upon the total weight of the build material composition. The biodegradable polyester filler particles are present in the build material composition without any additional filler particles.

15 Claims, 4 Drawing Sheets

(51) Int. Cl.
*C08K 3/36* (2006.01)
*C08K 13/04* (2006.01)
*C08L 67/02* (2006.01)
*C08L 67/04* (2006.01)
*C08L 77/06* (2006.01)
*B29K 67/00* (2006.01)
*B29K 77/00* (2006.01)
*B29K 105/00* (2006.01)
*B33Y 10/00* (2015.01)
*C08K 3/22* (2006.01)
*C08K 3/26* (2006.01)
*C08K 3/32* (2006.01)

(52) U.S. Cl.
CPC .. *B29K 2067/043* (2013.01); *B29K 2067/046* (2013.01); *B29K 2077/00* (2013.01); *B29K 2105/251* (2013.01); *B29K 2995/006* (2013.01); *B33Y 10/00* (2014.12); *C08K 2003/2227* (2013.01); *C08K 2003/2241* (2013.01); *C08K 2003/262* (2013.01); *C08K 2003/325* (2013.01); *C08L 2205/00* (2013.01)

(58) Field of Classification Search
CPC ...... B29K 2105/251; C08K 2003/2227; C08K 2003/2241; C08K 2003/262; C08K 2003/325; C08K 3/36; C08K 13/04; C08L 67/02; C08L 67/04; C08L 77/06; C08L 2205/00; B29C 64/165
USPC ............... 524/602, 606; 525/415, 437, 540; 264/331.19, 331.21, 494

See application file for complete search history.

(56) References Cited

U.S. PATENT DOCUMENTS

| | | | |
|---|---|---|---|
| 2015/0361258 A1 | 12/2015 | Mohanty et al. | |
| 2017/0043535 A1* | 2/2017 | Ng | B33Y 50/02 |
| 2018/0022024 A1* | 1/2018 | Saito | B33Y 70/10 |
| | | | 264/482 |
| 2018/0296343 A1 | 10/2018 | Wei | |
| 2019/0039296 A1* | 2/2019 | Prasad | B29C 64/165 |
| 2019/0047215 A1* | 2/2019 | Ge | B29C 64/153 |
| 2019/0254966 A1 | 8/2019 | Bellinger et al. | |
| 2019/0270882 A1 | 9/2019 | Zheng et al. | |
| 2021/0130608 A1* | 5/2021 | Gentsch | C08L 67/04 |

FOREIGN PATENT DOCUMENTS

| | | |
|---|---|---|
| JP | 2020-502288 A | 1/2020 |
| WO | 2014/115029 A2 | 7/2014 |
| WO | 2019/147263 A1 | 8/2019 |
| WO | 2019/199328 A1 | 10/2019 |

* cited by examiner

THREE-DIMENSIONAL PRINTING

BACKGROUND

Three-dimensional (3D) printing may be an additive printing process used to make three-dimensional objects from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial coalescence of the build material, and the mechanism for material coalescence (e.g., curing, thermal merging/fusing, melting, sintering, etc.) may depend upon the type of build material used. For some materials, at least partial coalescence may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
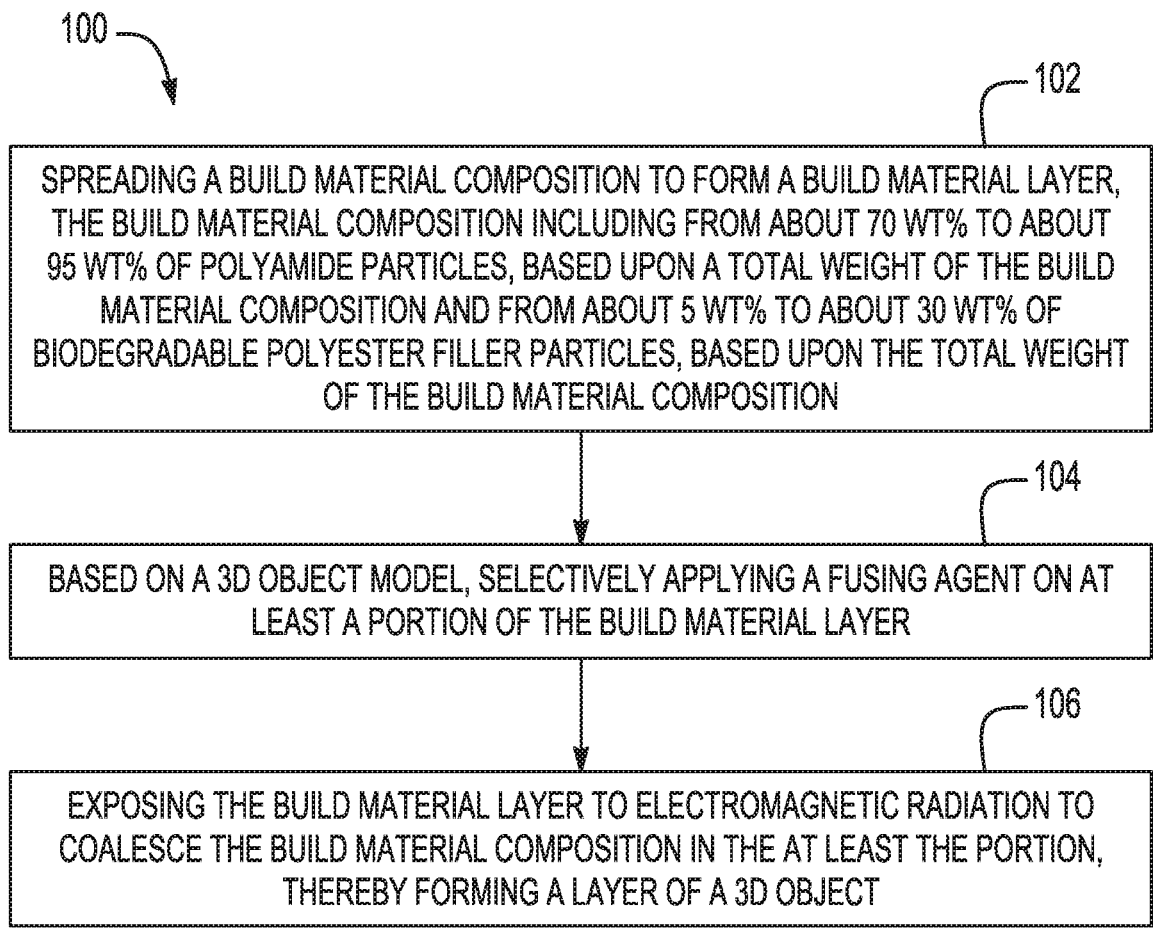
FIG. 1 is a flow diagram depicting an example of a 3D printing method.

Examples of the three-dimensional (3D) build material composition disclosed herein include polyamide particles and biodegradable polyester filler particles without any additional filler particles. As such, the build material composition disclosed herein is devoid of other filler particles, such as carbon fibers, carbon nanotubes, graphene nanoplatelets, graphite powder, polymer powders (e.g., polytetrafluoroethylene), glass beads, etc. In contrast to these other filler particles, the biodegradable polyester filler particles have been found to increase 3D object stiffness without also significantly increasing the weight of the 3D printed object. In particular, the present inventors have found that when the biodegradable polyester filler particles are used within the weight percentage range disclosed herein, desirable stiffness can be achieved while the impact on the overall weight is relatively low (e.g., 10% or less). Additionally, the polyester filler particles are biodegradable, which may render the build material composition desirable for use in a variety of applications, such as food packaging, biomedical applications, etc. The use of biodegradable polyester filler particles may also eliminate printer reliability issues associated with other fillers.

Throughout this disclosure, a weight percentage that is referred to as "wt % active" refers to the loading of an active component of a dispersion or other formulation that is present in the fusing agent, detailing agent, coloring agent, etc. For example, a pigment may be present in a water-based formulation (e.g., a stock solution or dispersion) before being incorporated into the coloring agent. In this example, the wt % actives accounts for the loading (as a weight percent) of the pigment solids that are present in the coloring agent, and does not account for the weight of the other components (e.g., water, co-solvent(s), etc.) that are present in the stock solution or dispersion with the pigment. The term "wt %," without the term actives, refers to the loading (in the respective agent) of a 100% active component that does not include other non-active components therein.

The term "particle size," as used herein, refers to a volume-weighted mean diameter or a mass-weighted mean diameter of a particle distribution. "D10" means that 10% of the particles in the distribution are less than the given size, "D50" means that 50% of the particles in the distribution are less than the given size, and "D90" means that 90% of the particles in the distribution are less than the given size.

Build Material Composition

Disclosed herein is a build material composition that includes from about 70 wt % to about 95 wt % of polyamide particles, based upon a total weight of the build material composition; and from about 5 wt % to about 30 wt % of biodegradable polyester filler particles, based upon the total weight of the build material composition, wherein the biodegradable polyester filler particles are present in the build material composition without any additional filler particles. In some examples, the build material composition consists of from about 70 wt % to about 95 wt % of the polyamide particles and from about 5 wt % to about 30 wt % of the biodegradable polyester filler particles. In other examples, the build material composition further includes an additive selected from the group consisting of a flow aid, an antioxidant, an antistatic agent, a whitener, and combinations thereof. In some examples, the build material composition consists of from about 70 wt % to about 95 wt % of the polyamide particles, from about 5 wt % to about 30 wt % of the biodegradable polyester filler particles, and the additive selected from the group consisting of the flow aid, the antioxidant, the antistatic agent, the whitener, and combinations thereof. In any of the example build material compositions, it is to be understood that additional filler particles are not included.

Examples of suitable polyamide particles are selected from the group consisting of polyamide-11 (PA 11/nylon 11), polyamide-12 (PA 12/nylon 12), polyamide-6 (PA 6/nylon 6), polyamide-8 (PA 8/nylon 8), polyamide-9 (PA 9/nylon 9), polyamide-66 (PA 66/nylon 66), polyamide-612 (PA 612/nylon 612), polyamide-812 (PA 812/nylon 812), polyamide-912 (PA 912/nylon 912), a thermoplastic polyamide, and combinations thereof.

In some examples, the polyamide particles may be in the form of a powder. In other examples, the polyamide particles may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polyamide particles may be made up of similarly sized particles and/or differently sized particles. In an example, the average particle size of the polymeric build material ranges from about 2 μm to about 225 μm. In another example, the average particle size of the polyamide particles ranges from about 10 μm to about 130 μm.

As mentioned, the build material composition includes from about 70 wt % to about 95 wt % of the polyamide particles, based upon a total weight of the build material composition. In another example, the build material composition includes from about 75 wt % to about 85 wt % of the polyamide particles, based upon a total weight of the build material composition.

Examples of suitable biodegradable polyester filler particles are selected from the group consisting of polylactic acid, polyglycolide, poly(DL-lactide-co-glycolide), polyethylene succinate, polybutylene succinate, polybutylene adipate, polybutylene succinate/adipate copolymer, polycaprolactone, and combinations thereof. It is to be understood that copolymers of these biodegradable polyesters (block copolymers, graft copolymers, etc.) and/or cross-linked systems of the biodegradable polyesters may also be used. The selection of the biodegradable polyester filler particles for the build material composition may depend upon the polyamide particles that are used and the melting point/range of the polyamide particles. It is desirable that polyamide particles and the biodegradable polyester filler particles melt at or near (e.g., within 15° of each other) the same melting point, or within the same melting temperature range.

Biodegradable polyester filler particles are commercially available, often in the form of pellets. These pellets may be ground prior to their incorporation into the build material composition. Grinding may reduce the size of the biodegradable polyester filler particles, and obtain a particle size distribution which is particularly suitable for the 3D printing process disclosed herein.

The biodegradable polyester filler particles may be made up of similarly sized particles and/or differently sized particles. In an example, the volume-based particle size distribution may include D10 ranging from about 25 μm to about 85 μm, D50 ranging from about 125 μm to about 145 μm, and D90 ranging from about 225 μm to about 245 μm. With this particle size distribution, the volume-weighted mean diameter of the biodegradable polyester filler particles may range from about 25 μm to about 475 μm. In another example, the average particle size of the biodegradable polyester filler particles ranges from about 25 μm to about 245 μm.

As mentioned, the build material composition includes from about 5 wt % to about 30 wt % of biodegradable polyester filler particles, based upon the total weight of the build material composition. In another example, the build material composition includes from about 10 wt % to about 20 wt % of the biodegradable polyester filler particles, based upon a total weight of the build material composition.

With the polyamide and biodegradable polyester filler particles, the build material composition may have a wide processing window of greater than 5° C., which can be defined by the temperature range between the melting point and the re-crystallization temperature. The polyamide and biodegradable polyester filler particles may have different melting points, and thus the blend of the materials may melt over a melting temperature range. In an example, the build material composition may have a melting temperature range ranging from about 50° C. to about 300° C. As other examples, the build material composition may have a melting temperature range ranging from about 155° C. to about 225° C., from about 155° C. to about 215° C., about 160° C. to about 200° C., or from about 165° C. to about 190° C.

In some of the examples disclosed herein, the polyamide particles are selected from the group consisting of polyamide-11, polyamide-12, polyamide-6, polyamide-8, polyamide-9, polyamide-66, polyamide-612, polyamide-812, polyamide-912, a thermoplastic polyamide, and combinations thereof; and the biodegradable polyester filler particles are selected from the group consisting of polylactic acid, polyglycolide, poly(DL-lactide-co-glycolide), polyethylene succinate, polybutylene succinate, polybutylene adipate, polybutylene succinate/adipate copolymer, polycaprolactone, and combinations thereof.

Neither the polyamide particles nor the biodegradable polyester filler particles substantially absorb radiation having a wavelength within the range of 400 nm to 1400 nm. In other examples, neither the polyamide particles nor the biodegradable polyester filler particles substantially absorb radiation having a wavelength within the range of 800 nm to 1400 nm. In these examples, the polyamide particles and the biodegradable polyester filler particles may be considered to reflect the wavelengths at which the biodegradable polyester filler particles do not substantially absorb radiation. The phrase "do or does not substantially absorb" means that the absorptivity of the polyamide particles and/or of the biodegradable polyester at a particular wavelength is 25% or less (e.g., 20%, 10%, 5%, etc.).

In some examples, the build material composition further includes an additive selected from the group consisting of a flow aid, an antioxidant, an antistatic agent, a whitener, and combinations thereof. While several examples of these additives are provided, it is to be understood that these additives are selected to be thermally stable (i.e., will not decompose) at the 3D printing temperatures.

In addition to the polyamide particles and the biodegradable polyester filler particles, some examples of the build material composition include a flow aid. The flow aid improves the coating flowability of the polyamide and biodegradable polyester filler particles, and enables the particles to be spread into thin, substantially uniform layers. The flow aid improves the flowability of the polyamide particles and the biodegradable polyester filler particles by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), fused metal oxide (e.g., the AEROXIDE® series, available from Evonik), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900).

In an example, the flow aid is added in an amount ranging from greater than 0 wt % to less than 5 wt %, based upon the total weight of the build material composition. As one example, the build material composition includes from greater than 95 wt % to less than 100 wt % of the polyamide and biodegradable polyester filler particles and from greater than 0 wt % to less than 5 wt % of the flow aid. In another example, the build material composition includes from about 0.05 wt % to about 1.5 wt % of the flow aid.

In addition to the polyamide particles and the biodegradable polyester filler particles, some examples of the build material composition include an antioxidant. Antioxidant(s) may be added to the build material composition to prevent or slow molecular weight decreases of the polyamide particles and/or the biodegradable polyester filler particles and/or may prevent or slow discoloration (e.g., yellowing) of the polyamide particles and/or the biodegradable polyester filler particles by preventing or slowing oxidation of the polyamide particles and/or the biodegradable polyester filler particles. The antioxidant may be selected to minimize discoloration. Examples of suitable antioxidants are selected from the group consisting of hindered phenols, phosphites, and organic sulfites. The antioxidant may be in the form of fine particles (e.g., having an average particle size of 5 μm or less) that are dry blended with the polyamide particles and the biodegradable polyester filler particles.

In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

In addition to the polyamide particles and the biodegradable polyester filler particles, some examples of the build material composition include a whitener. Whitener(s) may be added to the build material composition to improve visibility. Examples of suitable whiteners are selected from the group consisting of titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative).

Any example of the whitener may be included in the build material composition in an amount ranging from greater than 0 wt % to about 10 wt %, based on the total weight of the build material composition.

In addition to the polyamide particles and the biodegradable polyester filler particles, some examples of the build material composition include an antistatic agent(s). Antistatic agent(s) may be added to the build material composition to suppress tribo-charging. Examples of suitable antistatic agents are selected from the group consisting of aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.).

In an example, the antistatic agent is added in an amount ranging from greater than 0 wt % to less than 5 wt %, based upon the total weight of the build material composition.

To prepare the build material composition, the polyamide particles and the biodegradable polyester filler particles may be dry blended together, with or without any one or more of the additives. Any suitable conditions may be used to mix the biodegradable polyester filler particles with the polyamide particles. As examples, mixing may be accomplished in a rotating container, using a mechanical mixer, or using a hand mixer. Mixing may also be accomplished at ambient temperatures, which may range from about 18° C. to about 25° C. When a flow aid is included, the flow aid particles can stick to the surface of the polyamide particles and the biodegradable polyester filler particles and improve their flowability, and thus the flowability of the overall build material composition.

In some examples, the method may involve grinding biodegradable polyester pellets to form biodegradable polyester filler particles, which have a smaller particle size than the pellets. Grinding may be accomplished using any suitable grinder (e.g., an attritor, a ball mill, etc.), with or without grinding media (e.g., ceramic grinding beads). Some examples may include monitoring the volume-based particle size distribution throughout the grinding process, and then stopping the grinding once the desired particle size distribution is achieved. Once the biodegradable polyester filler particles are formed, they may be mixed with the polyamide particles and, if included, any additive(s), as described herein.

3D Printing Kits

Examples of the build material composition disclosed herein may be included in a 3D printing kit. In an example, the 3D printing kit includes a build material composition including from about 70 wt % to about 95 wt % of polyamide particles and from about 5 wt % to about 30 wt % of biodegradable polyester filler particles, each based upon the total weight of the build material composition; and a fusing agent including an energy absorber dissolved or dispersed in a liquid vehicle.

The build material composition may be any example disclosed herein, and does not include a filler in addition to the biodegradable polyester filler particles.

In other examples, the 3D printing kit may include the build material composition, the fusing agent, and a detailing agent. In still other examples, the 3D printing kit may include the build material composition, the fusing agent, and a coloring agent. In yet further examples, the 3D printing kit may include the build material composition, the fusing agent, the detailing agent, and the coloring agent.

As used herein, it is to be understood that the terms "material set" or "kit" may, in some instances, be synonymous with "composition." Further, "material set" and "kit" are understood to be or include compositions comprising one or more components, where the different components in the compositions are each contained in one or more containers, separately or in any combination, prior to and during printing, but can be combined together during printing. The containers can be any type of a vessel, box, or receptacle made of any material.

As mentioned above, various agents may be included in the 3D printing kits disclosed herein. Example compositions of the fusing agent, the detailing agent, and the coloring agent will now be described.

Fusing Agent

As mentioned herein, in examples of the 3D printing kit and/or the 3D printing method disclosed herein, a fusing agent may be used. Also as mentioned, the fusing agent includes an energy absorber dissolved or dispersed in a liquid vehicle.

Energy Absorbers

In some examples, the energy absorber may have substantial absorption (e.g., 80%) at least in the visible region (400 nm-780 nm) and may also absorb energy in the infrared region (e.g., 800 nm to 4000 nm). This absorption generates heat suitable for coalescing/fusing the build material composition in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions). As such, fusing agents with this type of energy absorber may be referred to as a core fusing agent. The core fusing agent may be used to pattern an entire 3D object, or to pattern a portion (e.g., the center) of a 3D object to impart mechanical integrity.

In other examples, the energy absorber may have absorption at wavelengths ranging from 800 nm to 4000 nm and have transparency at wavelengths ranging from 400 nm to 780 nm. Fusing agents with this type of energy absorber are referred to as the primer fusing agent, or, in some instances, the low tint fusing agent. This absorption and transparency allows the primer fusing agent to absorb enough radiation to coalesce/fuse the build material composition in contact therewith while enabling the 3D objects (or 3D objects regions) to be white or slightly colored. The primer/low tint fusing agent may be used to pattern an entire 3D object, or to pattern a portion (e.g., the outermost layers) of a 3D object to create a white or slightly colored outer appearance.

As used herein, "absorption" means that at least 80% of radiation having wavelengths within the specified range is absorbed. Also as used herein, "transparency" means that 25% or less of radiation having wavelengths within the specified range is absorbed.

In some examples, the energy absorber may be an infrared light absorbing colorant. In an example, the energy absorber is a near-infrared light absorbing colorant. Any near-infrared colorants, e.g., those produced by Fabricolor, Eastman Kodak, or BASF, Yamamoto, may be used in the fusing agent. As one example, the fusing agent may be a printing liquid formulation including carbon black as the energy absorber. Examples of this printing liquid formulation are commercially known as CM997A, 516458, C18928, C93848, C93808, or the like, all of which are available from HP Inc.

As another example, the fusing agent may be a printing liquid formulation including near-infrared absorbing dyes as the energy absorber. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

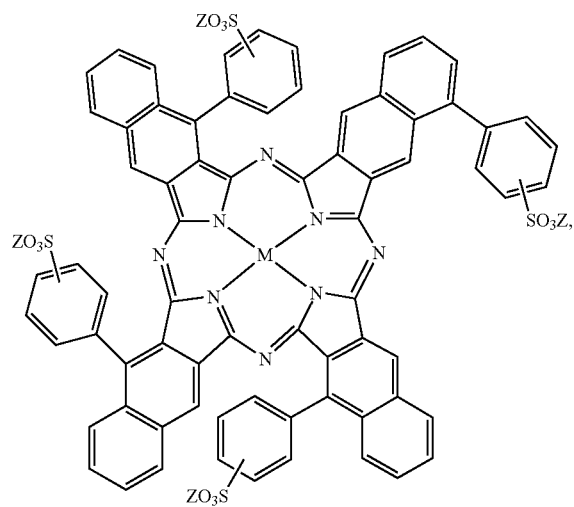
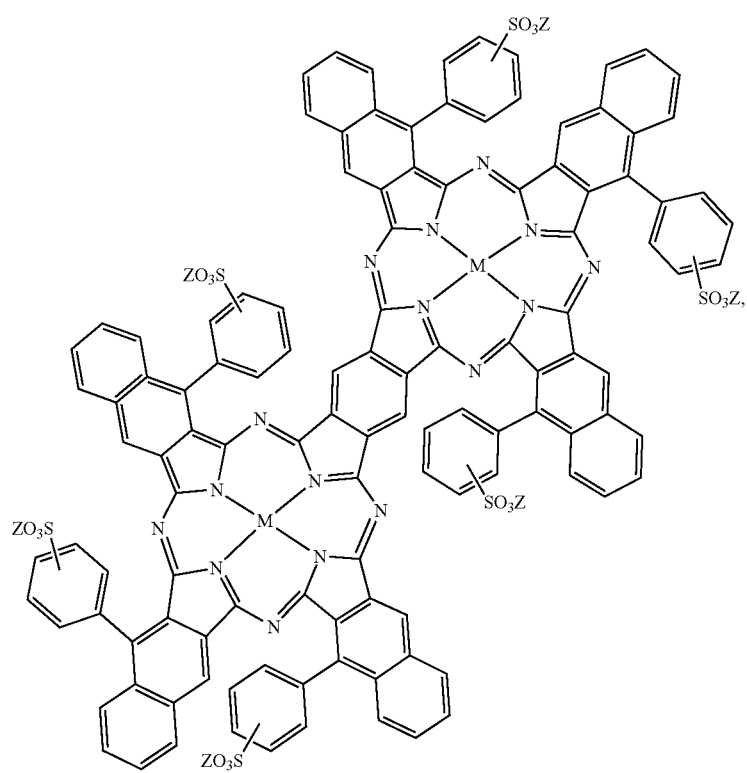

-continued

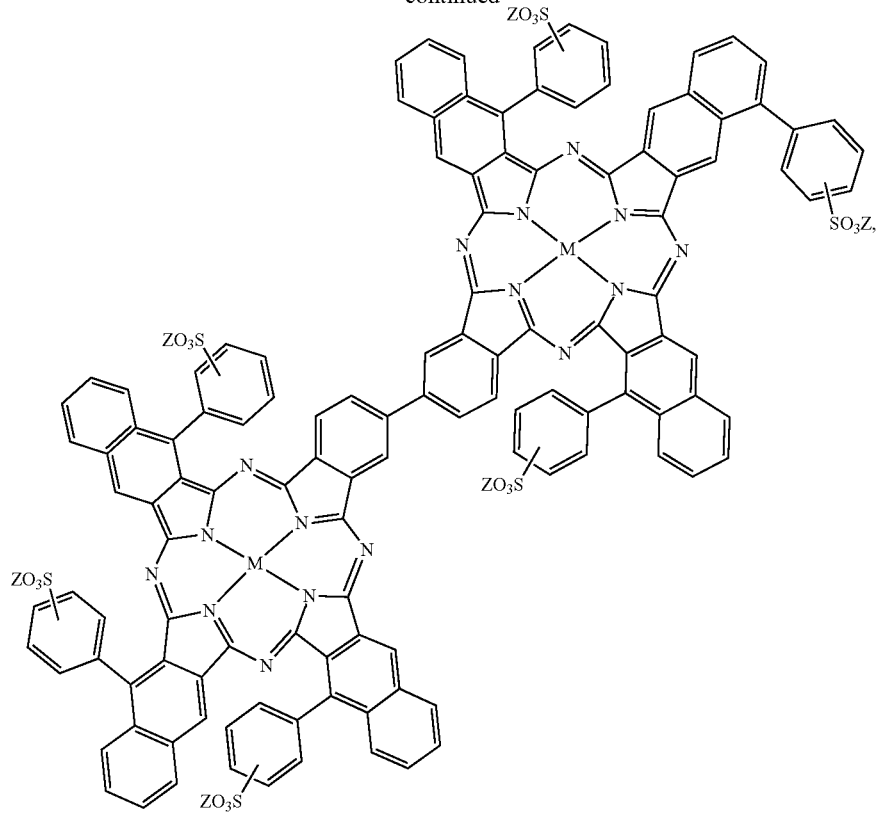

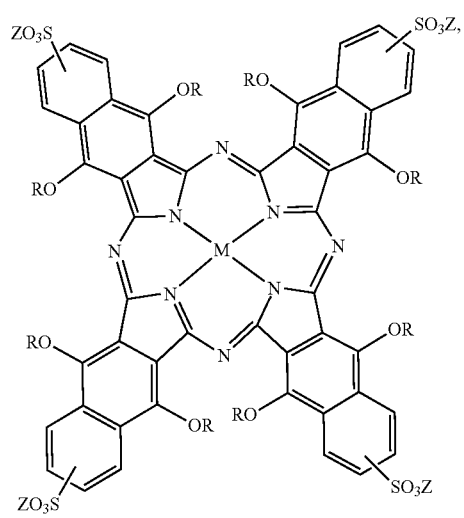

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

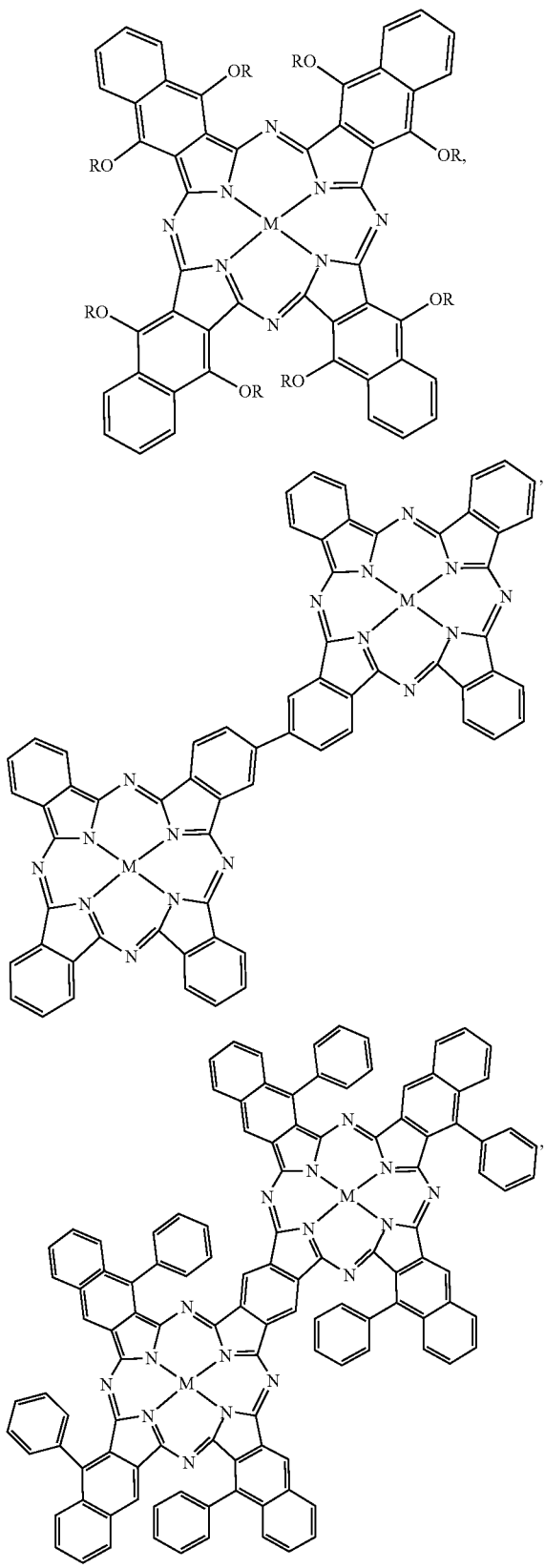

and mixtures thereof. For the hydrophobic near-infrared absorbing dyes, M can be a divalent metal atom (e.g., copper, etc.) or can include a metal that has Cl, Br, or OR' (R'=H, CH$_3$, COCH$_3$, COCH$_2$COOCH$_3$, COCH$_2$COCH$_3$) axial groups filling any unfilled valencies if the metal is more than divalent, and R can be hydrogen or any C$_1$-C$_8$ alkyl group (including substituted alkyl and unsubstituted alkyl).

Other near-infrared absorbing dyes or pigments may be used. Some examples include anthraquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

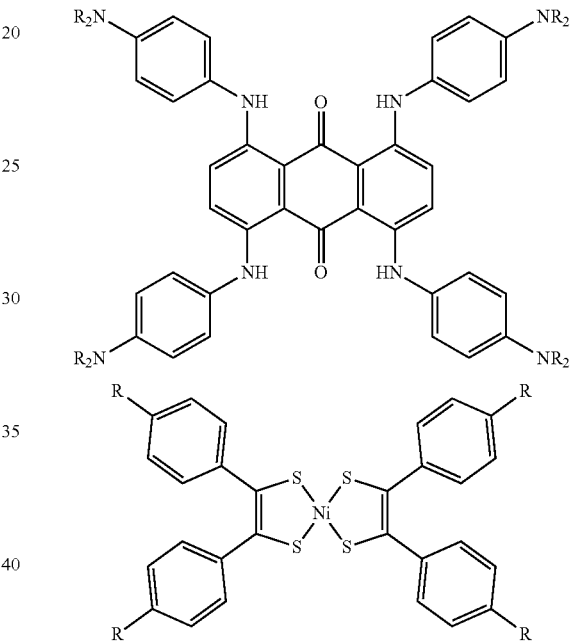

where R in the anthraquinone dyes or pigments may be hydrogen or any C$_1$-C$_8$ alkyl group (including substituted alkyl and unsubstituted alkyl), and R in the dithiolene may be hydrogen, COOH, SO$_3$, NH$_2$, any C$_1$-C$_8$ alkyl group (including substituted alkyl and unsubstituted alkyl), or the like.

Cyanine dyes or pigments and perylenediimide dyes or pigments may have the following structures, respectively:

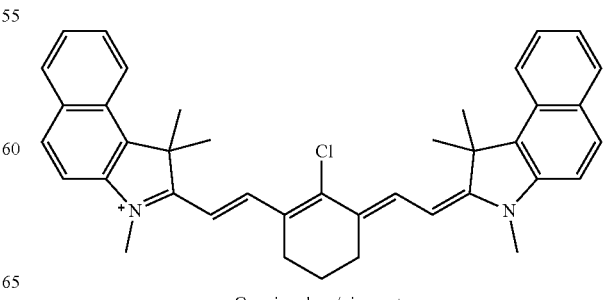

Cyanine dyes/pigments

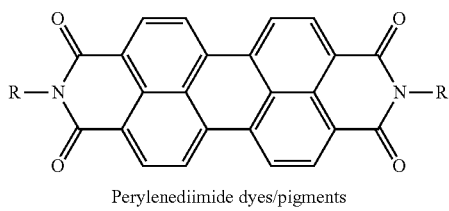

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

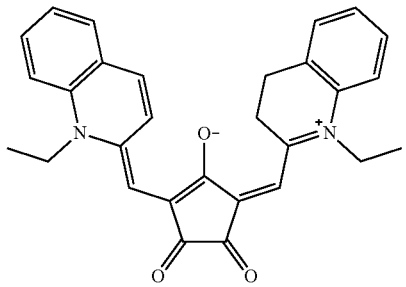

Croconium dyes/pigments

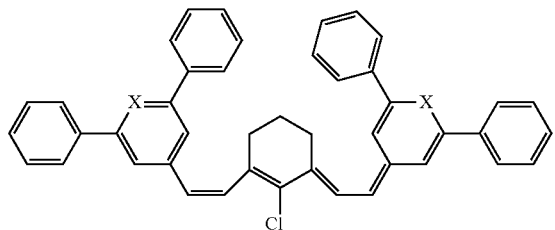

Pyrilium (X = O), thiopyrilium (X = S) dyes/pigments

Boron-dipyrromethene dyes or pigments and aza-boron-dipyrromethene dyes or pigments may have the following structures, respectively:

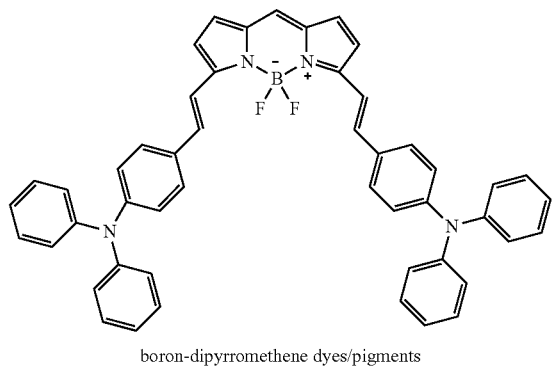

boron-dipyrromethene dyes/pigments

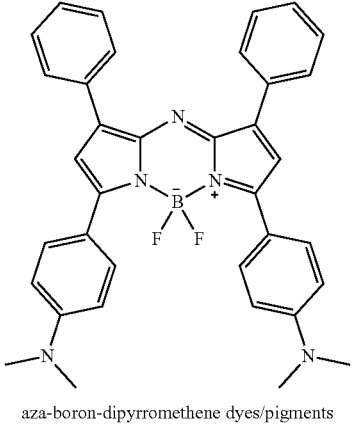

aza-boron-dipyrromethene dyes/pigments

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

As mentioned, in other examples, the energy absorber may be the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent to be inkjet jettable as well as electromagnetically selective (e.g., having absorption at wavelengths ranging from 800 nm to 4000 nm and transparency at wavelengths ranging from 400 nm to 780 nm).

In an example, this energy absorber has an average particle diameter (e.g., volume-weighted mean diameter) ranging from greater than 0 nm to less than 220 nm. In another example, the energy absorber has an average particle diameter ranging from greater than 0 nm to 120 nm. In still another example, the energy absorber has an average particle diameter ranging from about 10 nm to about 200 nm.

In an example, this energy absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

Still other examples of the energy absorber absorb at least some of the wavelengths within the range of 400 nm to 4000 nm. Examples include glass fibers, titanium dioxide, clay, mica, talc, barium sulfate, calcium carbonate, phosphate pigments, nitrocellulose, and/or silicate pigments. These energy absorbers are often white or lightly colored and may be used in either the core fusing agent or the primer/low tint fusing agent.

Phosphates may have a variety of counterions, such as copper, zinc, iron, magnesium, calcium, strontium, the like, and combinations thereof. Examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. Silicates can have the same or similar counterions as phosphates. Example silicates can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the phosphates and silicates described herein are not limited to counterions having a +2 oxidation state, and that other counterions can also be used to prepare other suitable near-infrared pigments.

The amount of the energy absorber that is present in the fusing agent ranges from greater than 0 wt % active to about 40 wt % active based on the total weight of the fusing agent. In other examples, the amount of the energy absorber in the fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the fusing agent having jetting reliability and heat and/or radiation absorbance efficiency.

FA Vehicles

As used herein, "FA vehicle" may refer to the liquid in which the energy absorber is dispersed or dissolved to form the fusing agent. A wide variety of FA vehicles, including aqueous and non-aqueous vehicles, may be used in the fusing agent.

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

When the energy absorber is an inorganic pigment (having absorption at wavelengths ranging from 800 nm to 4000 nm and transparency at wavelengths ranging from 400 nm to 780 nm), the FA vehicle may also include dispersant(s) and/or silane coupling agent(s).

Some examples of the energy absorber (e.g., the inorganic pigment having absorption at wavelengths ranging from 800 nm to 4000 nm and transparency at wavelengths ranging from 400 nm to 780 nm) may, in some instances, be dispersed with a dispersant. As such, the dispersant helps to uniformly distribute the energy absorber throughout the fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL®671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent may range from about 10 wt % to about 200 wt % based on the weight of the energy absorber in the fusing agent.

A silane coupling agent may also be added to the fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent may range from about 0.1 wt % active to about 50 wt % active based on the weight of the energy absorber in the fusing agent. In an example, the total amount of silane coupling agent(s) in the fusing agent ranges from about 1 wt % active to about 30 wt % active based on the weight of the energy absorber. In another example, the total amount of silane coupling agent(s) in the fusing agent ranges from about 2.5 wt % active to about 25 wt % active based on the weight of the energy absorber.

Classes of organic co-solvents that may be used in a water-based fusing agent include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol, 1,5-pentanediol, 2-methyl-1,3-propanediol, ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, 2-methyl-1,3-propanediol, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

The co-solvent(s) may be present in the fusing agent in a total amount ranging from about 1 wt % to about 65 wt % based upon the total weight of the fusing agent, depending upon the jetting architecture of the applicator. The biodegradable polyester filler particles in the build material composition may be susceptible to hydrolysis in the presence of water. As such, in some examples, it may be desirable for the fusing agent to include more co-solvent and a reduced amount of water (e.g., 65 wt % or less). As examples, the co-solvent(s) make up about 28 wt % and the water makes up about 65 wt % of the fusing agent, or the co-solvent(s) make up about 38 wt % and the water makes up about 55 wt % of the fusing agent, or the co-solvent(s) make up about 58 wt % and the water makes up about 35 wt % of the fusing agent.

As mentioned, the co-solvent(s) of the fusing agent may also depend, in part, upon the jetting technology that is to be used to dispense the fusing agent. For example, if thermal inkjet printheads are to be used, water and/or ethanol and/or other longer chain alcohols (e.g., pentanol) may be the primary solvent(s) (i.e., makes up 35 wt % or more of the fusing agent). For another example, if piezoelectric inkjet printheads are to be used, water may make up from about 25 wt % to about 30 wt % of the fusing agent, and the co-solvent may be the primary solvent (i.e., 35 wt % or more of the fusing agent).

The FA vehicle may also include humectant(s). An example of a suitable humectant is ethoxylated glycerin having the following formula:

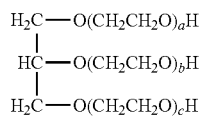

in which the total of a+b+c ranges from about 5 to about 60, or in other examples, from about 20 to about 30. An example of the ethoxylated glycerin is LIPONIC® EG-1 (LEG1, glycereth-26, a+b+c=26, available from Lipo Chemicals).

In an example, the total amount of the humectant(s) present in the fusing agent ranges from about 3 wt % active to about 10 wt % active, based on the total weight of the fusing agent.

In some examples, the FA vehicle includes surfactant(s) to improve the jettability of the fusing agent. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (an organic surfactant available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the fusing agent may range from about 0.01 wt % active to about 10 wt % active based on the total weight of the fusing agent. In an example, the total amount of surfactant(s) in the fusing agent may be about 0.75 wt % active based on the total weight of the fusing agent.

An anti-kogation agent may be included in the fusing agent that is to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® O3A or CRODAFOS® N-3 acid from Croda), dextran 500k, CRODAFOS™ HCE (phosphate-ester from Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent may range from greater than 0.10 wt % active to about 1.5 wt % active based on the total weight of the fusing agent. In an example, the oleth-3-phosphate is included in an amount ranging from about 0.20 wt % active to about 0.60 wt % active.

The FA vehicle may also include antimicrobial agent(s). Suitable antimicrobial agents include biocides and fungicides. Example antimicrobial agents may include the NUOSEPT™ (Troy Corp.), UCARCIDE™ (The Dow Chemical Company), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Company).

In an example, the fusing agent may include a total amount of antimicrobial agents that ranges from about 0.0001 wt % active to about 1 wt % active. In an example, the antimicrobial agent(s) is/are a biocide(s) and is/are present in the fusing agent in an amount ranging from about 0.25 wt % active to about 0.3 wt % active (based on the total weight of the fusing agent).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from greater than 0 wt % active to about 2 wt % active based on the total weight of the fusing agent. In an example, the chelating agent(s) is/are present in the fusing agent in an amount of about 0.08 wt % active (based on the total weight of the fusing agent).

The balance of the fusing agent is water (e.g., deionized water, purified water, etc.), which as described herein, may vary depending upon the other components in the fusing agent. In one example, the fusing agent is jettable via a thermal inkjet printhead, and includes from about 30 wt % to about 55 wt % water.

Detailing Agent

In some examples of the 3D printing kit and/or the 3D printing method disclosed herein, a detailing agent may be used. The detailing agent may be applied to portions of the build material composition that do not become part of the final 3D object. The detailing agent can provide a cooling effect to help prevent build material coalescence.

The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed herein in reference to the fusing agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1.00 wt % to about 65.00 wt % with respect to the total weight of the detailing agent. A reduced amount of water may be desirable for the detailing agent to reduce hydrolysis of the biodegradable polyester filler particles in the build material composition.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent, which absorbs wavelengths within the near-infrared spectrum. As such, the colorant in the detailing agent will not substantially absorb the fusing radiation, and thus will not initiate melting and fusing (coalescence) of the build material composition in contact therewith when the build material layer is exposed to the energy.

It may be desirable to add color to the detailing agent when the detailing agent is applied to build material that is adjacent to the edges of build material that is patterned with the core fusing agent. Color in the detailing agent may be desirable when used at the object edges because some of the colorant may become embedded in the build material that fuses/coalesces at the edges. As such, in some examples, the dye in the detailing agent may be selected so that its color matches the color of the energy absorber in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

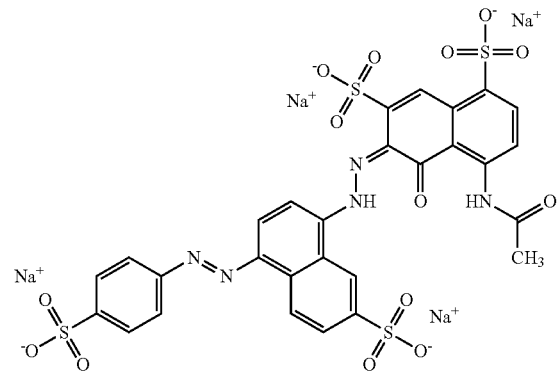

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

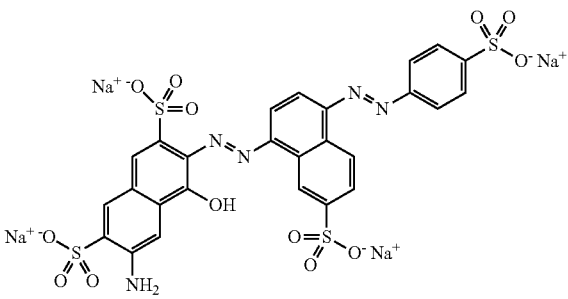

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

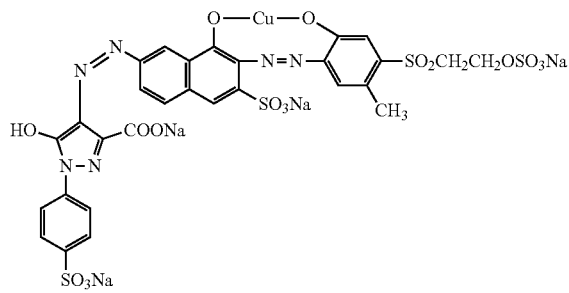

(commercially available as Reactive Black 31); tetrasodium (6E)-4-amino-5-oxo-3-[[4-(2-sutfonatooxyethylsulfonyl)phenyl]diazenyl]-6-[[4-(2-sufonatooxyethylsulfonyl)phenyl]hydrazinylidene]naphthalene-2,7-disulfonate with a chemical structure of:

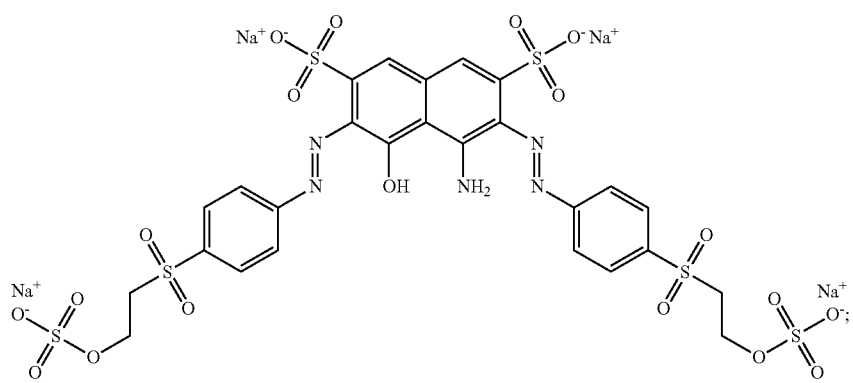

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JETS Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl]amino]phenyl]-(2-sulfophenyl) ethylidene]-1-cyclohexa-2,5-dienylidene]-[(3-sulfophenyl) methyl] azanium with a chemical structure of:

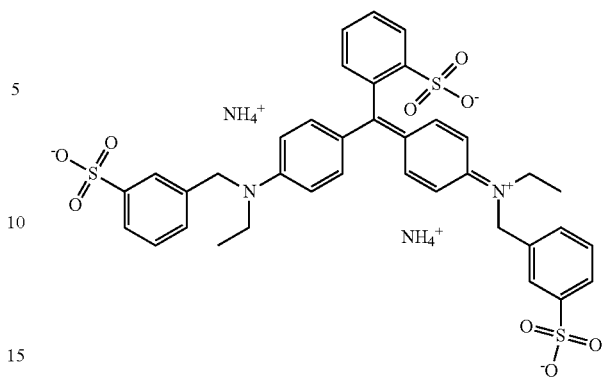

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

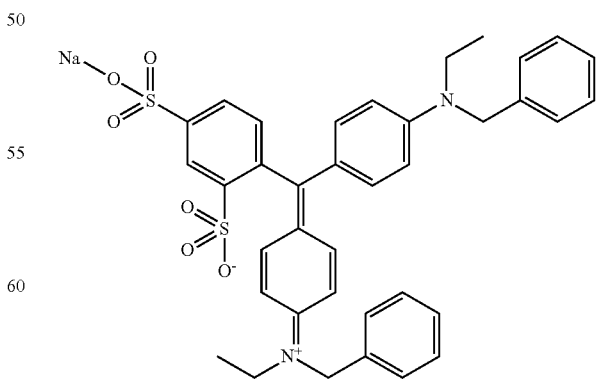

(commercially available as Acid Blue 7); and a phthalocyanine with a chemical structure of:

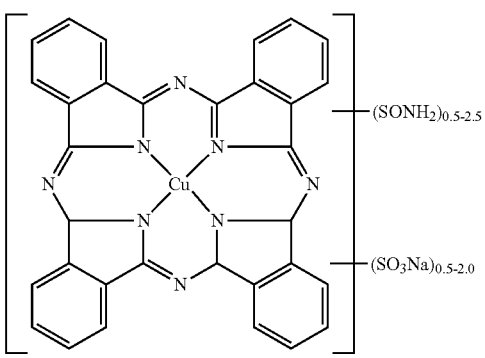

(commercially available as Direct Blue 199); and combinations thereof.

In an example of the detailing agent, the dye may be present in an amount ranging from about 1.00 wt % to about 3.00 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Coloring Agent

In any the examples of the multi-fluid kit, the 3D printing kit, and/or the 3D printing method disclosed herein, a coloring agent may be used. The coloring agent may be used to impart color to the 3D object.

The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described herein in reference to the fusing agent).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum. As such, the colorant in the coloring agent will not substantially absorb the fusing radiation, and thus will not initiate coalescing/fusing of the build material composition in contact therewith when the build material composition is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

Printing Methods and Methods of Use

Referring now to FIG. 1, an example a method 100 for 3D printing is depicted. The examples of the method 100 may use an example of the build material composition and/or of the 3D printing kit disclosed herein.

As shown in FIG. 1, the method 100 for three-dimensional (3D) printing comprises: spreading a build material composition to form a build material layer, the build material composition including from about 70 wt % to about 95 wt % of polyamide particles, based upon a total weight of the build material composition and from about 5 wt % to about 30 wt % of biodegradable polyester filler particles, based upon the total weight of the build material composition (reference numeral 102); based on a 3D object model, selectively applying a fusing agent on at least a portion of the build material layer (reference numeral 104); and exposing the build material layer to electromagnetic radiation to coalesce the build material composition in the at least the portion, thereby forming a layer of a 3D object (reference numeral 106).

Prior to execution of the method 100, it is to be understood that a controller may access data stored in a data store pertaining to a 3D object that is to be printed. For example, the controller may determine the number of layers of the build material composition that are to be formed, the locations at which any of the agents is/are to be deposited on each of the respective layers, etc.

Figure 2:
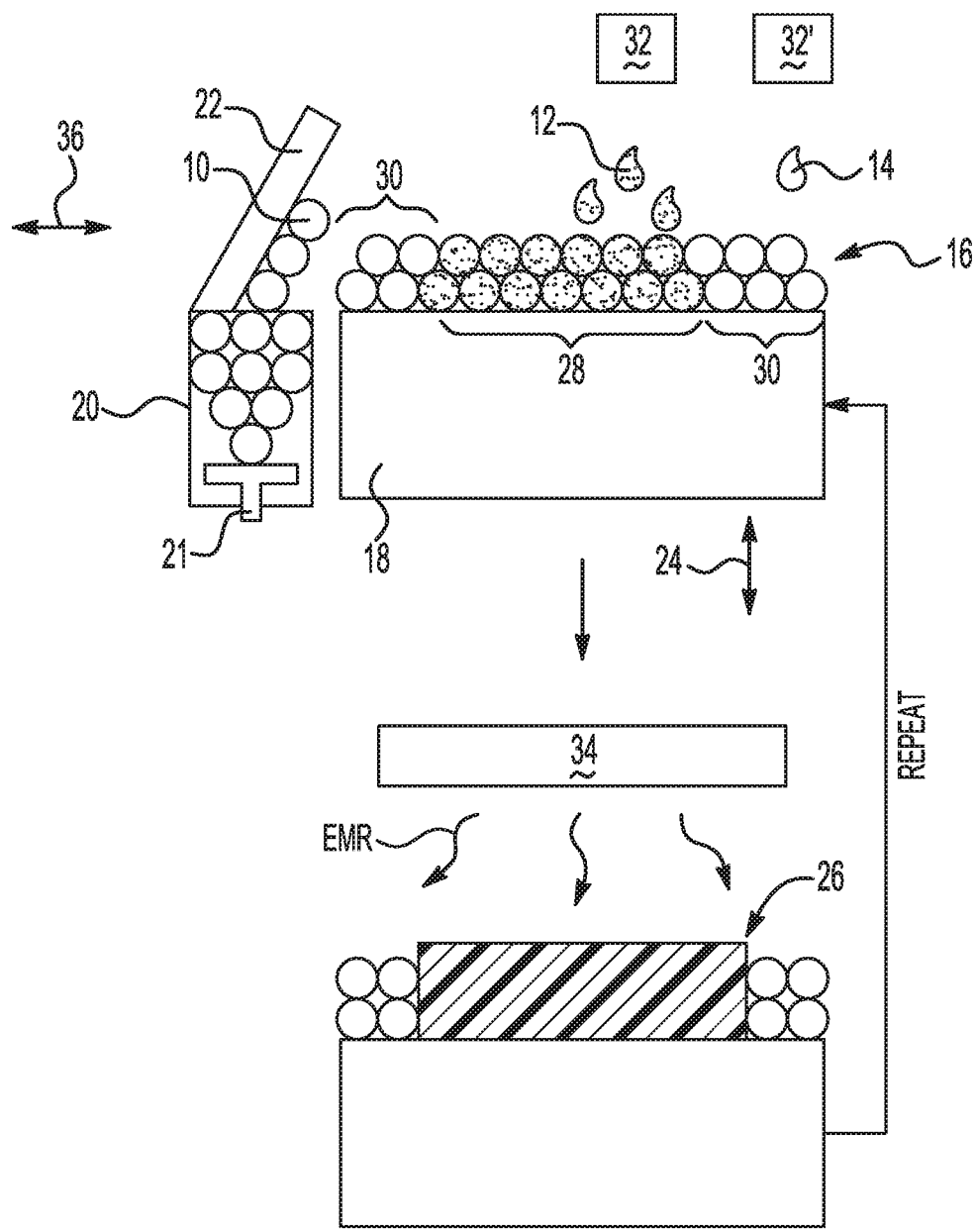
FIG. 2 is a schematic illustration of an example of a 3D printing method.

Referring now to FIG. 2, an example of the method 100, which utilizes the build material composition 10 (including at least the polyamide particles and the biodegradable polyester filler particles), the fusing agent 12 and the detailing agent 14 is graphically depicted.

In FIG. 2, a layer 16 of the build material composition 10 is applied on a build area platform 18. A printing system may be used to apply the build material composition 10. The printing system may include the build area platform 18, a build material supply 20 containing the build material composition 10, and a build material distributor 22.

The build area platform 18 is a substantially horizontal build platform that does not function as a mold for the build material composition 10 applied thereto. Rather, the build area platform is a flat surface upon which the build material composition 10 can be applied and patterned to define any desirable shape. The build area platform 18 may be integrated with the printing system or may be a component that is separately insertable into the printing system. For example, the build area platform 18 may be a module that is available separately from the printing system. The build material platform 18 that is shown is also one example, and could be replaced with another support member, such as a platen, a fabrication/print bed, a glass plate, or another build surface.

The build area platform 18 receives the build material composition 10 from the build material supply 20. The build area platform 18 may be moved in the directions as denoted by the arrow 24, e.g., along the z-axis, so that the build material composition 10 may be delivered to the build area platform 18 or to a previously formed layer. In an example, when the build material composition 10 is to be delivered, the build area platform 18 may be programmed to advance (e.g., downward) enough so that the build material distributor 22 can push, or another dispenser can dispense, the build material composition 10 onto the build area platform 18 to form a substantially uniform layer of the build material composition 10 thereon. The build area platform 18 may also be returned to its original position, for example, when a new part is to be built.

The build material supply 20 may be a container, bed, or other vessel or surface that is to deliver the build material composition 10 into a suitable position for spreading. In one example (not shown in FIG. 2), the build material supply 20 is a remote vessel that feeds the build material composition 10 into a build material dispenser (e.g., a feeder vane) from above through a tube or other conduit. In some instances, the build material supply 20 may be part of the build material dispenser, and thus may translate with the build material dispenser. In this example, the dispenser may be moved in the directions as denoted by the arrow 36, e.g., along the y-axis, over and across the build area platform 18 to spread the layer 16 of the build material composition 10 over the build area platform 18. This enables the build material composition 10 to be delivered continuously to the build area platform 18 rather than being supplied from a single location at the side of the printing system as depicted in FIG. 2. In this example, the build material distributor 22 could also be used to smooth the dispensed layer 16.

In the example shown in FIG. 2, the build material supply 20 includes a mechanism 21 (e.g., a delivery piston or pump) to provide, e.g., move, the build material composition 10 from a storage location to a position to be spread onto the build area platform 18 or onto a previously patterned layer. For example, as shown in FIG. 2, the build material supply 20 may be a stationary container located at the side of the printing system, and its delivery mechanism 21 can push the build material composition 10 into a position where it can be spread across the build area platform 18, e.g., by the build material distributor 22.

The build material distributor 22 may be moved in the directions as denoted by the arrow 36, e.g., along the y-axis, over the build material supply 20 and across the build area platform 18 to spread the layer 16 of the build material composition 10 over the build area platform 18. The build material distributor 22 may also be returned to a position adjacent to the build material supply 20 following the spreading of the build material composition 10. The build material distributor 22 may be a blade (e.g., a doctor blade), a roller, a combination of a roller and a blade, and/or any other device capable of spreading the build material composition 10 over the build area platform 18. For instance, the build material distributor 22 may be a counter-rotating roller Any example of the build material supply 20 may include heaters so that the build material composition 10 is heated to a supply temperature ranging from about 25° C. to about 150° C. In these examples, the supply temperature may depend, in part, on the build material composition 10 used and/or the 3D printer used. As such, the range provided is one example, and higher or lower temperatures may be used.

To generate a layer 16 of the build material composition 10, the controller (not shown) may process data, and in response, the build material supply 20 may transmit the build material composition 10 to a dispenser, or may appropriately position the particles of the build material composition 10 for spreading by the build material distributor 22. The controller may also process additional data, and in response, control the build material distributor 22 to spread the build material composition 10 over the build area platform 18 to form the layer 16 of the build material composition 10 thereon. In FIG. 2, one build material layer 16 has been formed.

The layer 16 has a substantially uniform thickness across the build area platform 18. In an example, the build material layer 16 has a thickness ranging from about 50 μm to about 950 μm. In another example, the thickness of the build material layer 16 ranges from about 30 μm to about 300 μm. It is to be understood that thinner or thicker layers may also be used. For example, the thickness of the build material layer 16 may range from about 20 μm to about 500 μm. The layer thickness may be about 2× (i.e., 2 times) the average particle size of the polyamide particles at a minimum for finer part definition. In some examples, the layer 16 thickness may be about 1.2× the average particle size of the polyamide particles.

After the build material composition 10 has been applied, and prior to further processing, the build material layer 16 may be exposed to pre-heating. In an example, the pre-heating temperature may be below the melting points of the polyamide particles and of the biodegradable polyester filler particles of the build material composition 10. As examples, the pre-heating temperature may range from about 5° C. to about 50° C. below the melting points of the polyamide particles and the biodegradable polyester filler particles. In an example, the pre-heating temperature ranges from about 50° C. to about 205° C. In still another example, the pre-heating temperature ranges from about 100° C. to about 190° C. The low pre-heating temperature may enable the non-patterned build material composition 10 to be easily removed from the 3D object after completion of the 3D object. In these examples, the pre-heating temperature may depend, in part, on the build material composition 10 used.

As such, the ranges provided are some examples, and higher or lower temperatures may be used.

Pre-heating the layer 16 may be accomplished by using any suitable heat source that exposes all of the build material composition 10 in the layer 16 to the heat. Examples of the heat source include a thermal heat source (e.g., a heater (not shown) integrated into the build area platform 18 (which may include sidewalls)) or a radiation source 34.

After the layer 16 is formed, and in some instances is pre-heated, the fusing agent 12 is selectively applied on at least some of the build material composition 10 in the layer 16.

To form a layer 26 of a 3D object, at least a portion (e.g., portion 28) of the layer 16 of the build material composition 10 is patterned with the fusing agent 12. The volume of the fusing agent 12 that is applied per unit of the build material composition 10 in the patterned portion 28 may be sufficient to absorb and convert enough electromagnetic radiation so that the build material composition 10 in the patterned portion 28 will coalesce/fuse. The volume of the fusing agent 12 that is applied per unit of the build material composition 10 may depend, at least in part, on the energy absorber used, the energy absorber loading in the fusing agent 12, and the build material composition 10 used.

The portion(s) 30 are not patterned with the fusing agent 12 and thus are not to become part of the final 3D object layer 26. In one example of the method 100, no agents are applied on the portion(s) 30.

In the example of the method 100 shown in FIG. 2, the detailing agent 14 is selectively applied to the portion(s) 30 of the layer 16. The detailing agent 14 may provide an evaporative cooling effect to the build material composition 10 to which it is applied. The evaporative cooling effect of the detailing agent 14 may be used to aid in preventing the build material composition 10 in the portion(s) 30 from coalescing/fusing. The evaporative cooling provided by the detailing agent 14 may remove energy from the portion(s) 30, which may lower the temperature of the build material composition 10 in the portion(s) 30 and prevent the build material composition 10 in the portion(s) 30 from coalescing/fusing. As such, examples of the method 100 may include selectively applying a detailing agent 14 on another portion 30 of the build material layer 16 that is to remain non-coalesced after the electromagnetic radiation exposure.

In examples of the method 100, any of the agents 12, 14 may be dispensed from an applicator 32, 32'. The applicator(s) 32, 32' may each be a thermal inkjet printhead, a piezoelectric printhead, a continuous inkjet printhead, etc., and the selective application of the agent(s) 12, 30 may be accomplished by thermal inkjet printing, piezo electric inkjet printing, continuous inkjet printing, etc. Other applicators 32, 32' may be used that can selectively dispense a controlled amount of the agent(s) 12, 14. The controller may process data, and in response, control the applicator(s) 32, 32' to deposit the agent(s) 12, 14 onto predetermined portion(s) 28, 30 of the build material composition 10. It is to be understood that the applicators 32, 32' may be separate applicators or a single applicator with several individual cartridges for dispensing the respective agents 12, 14.

It is to be understood that the selective application of the agent(s) 12, 14 may be accomplished in a single printing pass or in multiple printing passes. In some examples, the agent(s) 12, 14 is/are selectively applied in a single printing pass. In some other examples, the agent(s) 12, 14 is/are selectively applied in multiple printing passes. In one of these examples, the number of printing passes ranging from 2 to 4. It may be desirable to apply the agent(s) 12, 14 in multiple printing passes to increase the amount, e.g., of the energy absorber, detailing agent, etc. that is applied to the build material composition 10, to avoid liquid splashing, to avoid displacement of the build material composition 10, etc.

After the agent(s) 12, 14 is/are selectively applied in the specific portion(s) 28, 30 of the layer 16, the entire layer 16 of the build material composition 10 is exposed to electromagnetic radiation (shown as EMR in FIG. 2).

The electromagnetic radiation is emitted from the radiation source 34. The length of time the electromagnetic radiation is applied for, or energy exposure time, may be dependent, for example, on one or more of: characteristics of the radiation source 34; characteristics of the build material composition 10; and/or characteristics of the fusing agent 12.

It is to be understood that the electromagnetic radiation exposure may be accomplished in a single radiation event or in multiple radiation events. In an example, the exposing of the build material composition 10 is accomplished in multiple radiation events. In a specific example, the number of radiation events ranges from 3 to 8. It may be desirable to expose the build material composition 10 to electromagnetic radiation in multiple radiation events to counteract a cooling effect that may be brought on by the amount of the fusing agent 12 that is applied to the build material layer 16. Additionally, it may be desirable to expose the build material composition 10 to electromagnetic radiation in multiple radiation events to sufficiently elevate the temperature of the build material composition 10 in the portion(s) 28, without over heating the build material composition 10 in the portion(s) 30.

The fusing agent 12 enhances the absorption of the radiation, converts the absorbed radiation to thermal energy, and promotes the transfer of the thermal heat to the build material composition 10 in contact therewith. In an example, the fusing agent 12 sufficiently elevates the temperature of the build material composition 10 in the portion 28 to a temperature above the melting points of the polyamide particles and the biodegradable polyester filler particles, allowing coalescing/fusing of the build material composition 10 to take place. The application of the electromagnetic radiation forms the 3D object layer 26.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 12 and may heat the build material composition 10 in contact therewith, and may not be substantially absorbed (e.g., 25% or less of the applied radiation is absorbed) by the build material composition 10 in portion(s) 30.

After the 3D object layer 26 is formed, additional layer(s) may be formed thereon to create an example of the 3D object. To form the next layer, additional build material composition 10 may be applied on the 3D object layer 26. The fusing agent 12 is then selectively applied on at least a portion of the additional build material composition 10, according to the 3D object model. The detailing agent 14 may be applied in any area of the additional build material composition 10 where coalescence is not desirable. After the agent(s) 12, 14 is/are applied, the entire layer of the additional build material composition 10 is exposed to electromagnetic radiation in the manner described herein. The application of additional build material composition 10, the selective application of the agent(s) 12, 30 and the electromagnetic radiation exposure may be repeated a predetermined number of cycles to form the final 3D object in accordance with the 3D object model.

As such, examples of the method 100 include iteratively applying individual build material layers 16 of the build material composition 10; based on the 3D object model, selectively applying the fusing agent 12 to at least some of the individual build material layers 16 to define individually patterned layers; and iteratively exposing the individually patterned layers to the electromagnetic radiation to form individual object layers 26.

The build material composition 10 that does not become part of the 3D object (e.g., the build material composition in portion(s) 32) may be reclaimed to be reused as build material in the printing of another 3D object.

To impart color to the 3D object, the coloring agent may be applied with the fusing agent 12 and/or on the outermost layer after the 3D object is formed. In these examples, the fusing agent 12 may be the primer/low tint fusing agent, which includes an energy absorber that is clear or slightly tinted (e.g., the energy absorber that has absorption at wavelengths ranging from 800 nm to 4000 nm and transparency at wavelengths ranging from 400 nm to 780 nm).

The example of the method 100 shown in FIG. 2 utilizes a single fusing agent 12, which may be the core fusing agent or the primer/low tint fusing agent described herein. In other examples of the method 100, both the core fusing and the primer/low tint fusing agent may be used to pattern different portions of the build material layers 16. For example, it may be desirable to utilize the core fusing agent to form the core (e.g., the center or inner-most portion) of the 3D object, and it may be desirable to utilize the primer/low tint fusing agent to form the outermost layers of the 3D object. The core fusing agent can impart strength to the core of the 3D object, while the primer fusing agent enables white or a color to be exhibited at the exterior of the 3D object.

In any of the examples of the method 100 disclosed herein, differently shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

To further illustrate the present disclosure, examples are given herein. It is to be understood that these examples are provided for illustrative purposes and are not to be construed as limiting the scope of the present disclosure.

EXAMPLES

Example 1

Several example build material compositions (1-4) and several comparative build material compositions (5 and 6) were prepared. The example build material compositions included polyamide-12 powder (PA-12) (HP 3D High Reusability PA 12, melting point about 187° C.) and polylactic acid (PLA filler) (melting point about 169° C.). The comparative build material compositions included polyamide-12 powder and glass beads (GB filler). Two control build material compositions (7 and 8) included polyamide-12 without any filler material. The build material compositions are shown in Table 1, including the weight percentage of each component of the total weight of the composition.

The polyamide-12 powder and the polylactic acid or glass beads were dry blended together. Prior to dry blending, the polylactic acid was ground to reduce the particle size. The resulting PLA powder had a particle size distribution (by number) with D10, D50, and D90 being 15 µm, 22 µm, and 87 µm, respectively.

TABLE 1

| Build Material Composition ID | PA-12 (wt %) | PLA Filler (wt %) | GB Filler (wt %) |
| --- | --- | --- | --- |
| Ex. 1 | 90 | 10 | — |
| Ex. 2 | 90 | 10 | — |
| Ex. 3 | 70 | 30 | — |
| Ex. 4 | 70 | 30 | — |
| Comp. Ex. 5 | 60 | — | 40 |
| Comp. Ex. 6 | 60 | — | 40 |
| Control Ex. 7 | 100 | — | — |
| Control Ex. 8 | 100 | — | — |

The various build material compositions were injection molded to form dog bone shaped 3D objects. The overall weight of each 3D object was measured, and the results are shown in Table 2.

TABLE 2

| 3D Object ID | Build Material Composition ID | 3D Object Weight (g) |
| --- | --- | --- |
| Ex. Dog Bone 1 | Ex. 1 | 1.498 |
| Ex. Dog Bone 2 | Ex. 2 | 1.496 |
| Ex. Dog Bone 3 | Ex. 3 | 1.565 |
| Ex. Dog Bone 4 | Ex. 4 | 1.558 |
| Comp. Ex. Dog Bone 5 | Comp. Ex. 5 | 1.898 |
| Comp. Ex. Dog Bone 6 | Comp. Ex. 6 | 1.905 |
| Control Dog Bone 7 | Control Ex. 7 | 1.461 |
| Control Dog Bone 8 | Control Ex. 8 | 1.458 |

As shown in Table 2, the overall weight of each example 3D object (Ex. Dog Bones 1-4) relative to the control 3D objects (Control Dog Bones 7 and 8) increased with increasing PLA filler concentration. The weight of each comparative example 3D object (Comp. Ex. Dog Bones 5 and 6) was also increased relative to the control 3D objects (Control Dog Bones 7 and 8), and also relative to each of the example 3D object (Ex. Dog Bones 1-4). Overall, the comparative example 3D objects (Comp. Ex. Dog Bones 5 and 6) had a 30% weight gain relative to the control 3D objects (Control Dog Bones 7 and 8). In contrast, the example 3D objects with less PLA filler (Ex. Dog Bones 1 and 2) resulted in a 2% weight gain relative to the control 3D objects (Control Dog Bones 7 and 8), and the example 3D objects with more PLA filler (Ex. Dog Bones 3 and 4) resulted in a 7% weight gain relative to the control 3D objects (Control Dog Bones 7 and 8).

Example 2

Another control build material composition, Control. Ex. 9, was used in this example. This control build material composition included neat polyamide-12 without additional fillers, and thus was similar to Control Ex. 7 and Control Ex. 8 in Example 1.

Two additional example build material compositions (Ex. 10 and Ex. 11) were also prepared. Ex. 10 included 90 wt % of the same polyamide-12 powder from Example 1 and 10 wt % of the same PLA filler from Example 1, and thus was similar to Ex. 1 and Ex. 2 in Example 1. Ex. 11 included 70 wt % of the same polyamide-12 powder from Example 1 and 30 wt % of the same PLA filler from Example 1, and thus was similar to Ex. 3 and Ex. 4 in Example 1.

Control Ex. 9 build material composition was used to 3D print 7 control dog bone shaped 3D objects (Control Dog Bones 27-33). Ex. 10 build material composition was used to 3D print 7 example dog bone shaped 3D objects (Example Dog Bones 12-18). Ex. 11 build material composition was used to 3D print 8 example dog bone shaped 3D objects (Example Dog Bones 19-26). All of the control and example dog bone shaped 3D object were printed on a small testbed 3D printer (bed temp 135° C.) with an example fusing agent (2 printing passes) that included carbon black as the energy absorber. Each of the example 3D objects was sufficiently fused/coalesced. Further, the non-patterned build material adjacent to each of the 3D objects was able to be removed and separated from the completed 3D object. The dog bone shaped 3D printed objects are identified in Table 3.

TABLE 3

| 3D Object ID | Build Material Composition ID |
| --- | --- |
| Ex. Dog Bone 12 | Ex. 10 |
| | (90 wt % PA-12 & 10 wt % PLA) |
| Ex. Dog Bone 13 | Ex. 10 |
| Ex. Dog Bone 14 | Ex. 10 |
| Ex. Dog Bone 15 | Ex. 10 |
| Ex. Dog Bone 16 | Ex. 10 |
| Ex. Dog Bone 17 | Ex. 10 |
| Ex. Dog Bone 18 | Ex. 10 |
| Ex. Dog Bone 19 | Ex. 11 |
| | (70 wt % PA-12 & 30 wt % PLA) |
| Ex. Dog Bone 20 | Ex. 11 |
| Ex. Dog Bone 21 | Ex. 11 |
| Ex. Dog Bone 22 | Ex. 11 |
| Ex. Dog Bone 23 | Ex. 11 |
| Ex. Dog Bone 24 | Ex. 11 |
| Ex. Dog Bone 25 | Ex. 11 |
| Ex. Dog Bone 26 | Ex. 11 |
| Control Dog Bone 27 | Comp. Ex. 12 |
| | (Neat PA-12) |
| Control Dog Bone 28 | Comp. Ex. 12 |
| Control Dog Bone 29 | Comp. Ex. 12 |
| Control Dog Bone 30 | Comp. Ex. 12 |
| Control Dog Bone 31 | Comp. Ex. 12 |
| Control Dog Bone 32 | Comp. Ex. 12 |
| Control Dog Bone 33 | Comp. Ex. 12 |

Young's Modulus, the ultimate tensile strength at maximum load, and strain at break of each of the example and control dog bone shaped 3D objects were measured using Instron testing equipment. Table 4 shows the results.

TABLE 4

| 3D Object ID | Young's Modulus (MPa) | Tensile Stress at Maximum Load (MPa) | % Strain at Break |
| --- | --- | --- | --- |
| Ex. Dog Bone 12 | 1891 | 46.4 | 64.9 |
| Ex. Dog Bone 13 | 1675 | 42.3 | 25.0 |
| Ex. Dog Bone 14 | 2139 | 47.3 | 49.1 |
| Ex. Dog Bone 15 | 1739 | 42.7 | 20.9 |
| Ex. Dog Bone 16 | 1966 | 46.3 | 59.3 |
| Ex. Dog Bone 17 | 1883 | 43.2 | 21.6 |
| Ex. Dog Bone 18 | 1649 | 42.6 | 20.4 |
| Ex. Dog Bone 19 | 2000 | 37.0 | 13.4 |
| Ex. Dog Bone 20 | 1806 | 35.1 | 4.5 |
| Ex. Dog Bone 21 | 1736 | 36.4 | 14.7 |
| Ex. Dog Bone 22 | 1857 | 33.2 | 4.0 |
| Ex. Dog Bone 23 | 1982 | 33.9 | 10.2 |
| Ex. Dog Bone 24 | 1764 | 32.8 | 2.8 |
| Ex. Dog Bone 25 | 1785 | 35.8 | 8.6 |
| Ex. Dog Bone 26 | 1937 | 33.6 | 5.7 |
| Control Dog Bone 27 | 1592 | 47.7 | 61.4 |
| Control Dog Bone 28 | 1552 | 44.2 | 24.1 |
| Control Dog Bone 29 | 1628 | 47.2 | 91.4 |
| Control Dog Bone 30 | 1615 | 44.8 | 21.0 |
| Control Dog Bone 31 | 1759 | 46.5 | 20.8 |
| Control Dog Bone 32 | 1755 | 48.0 | 58.7 |
| Control Dog Bone 33 | 1622 | 45.8 | 26.6 |

Figure 3A:
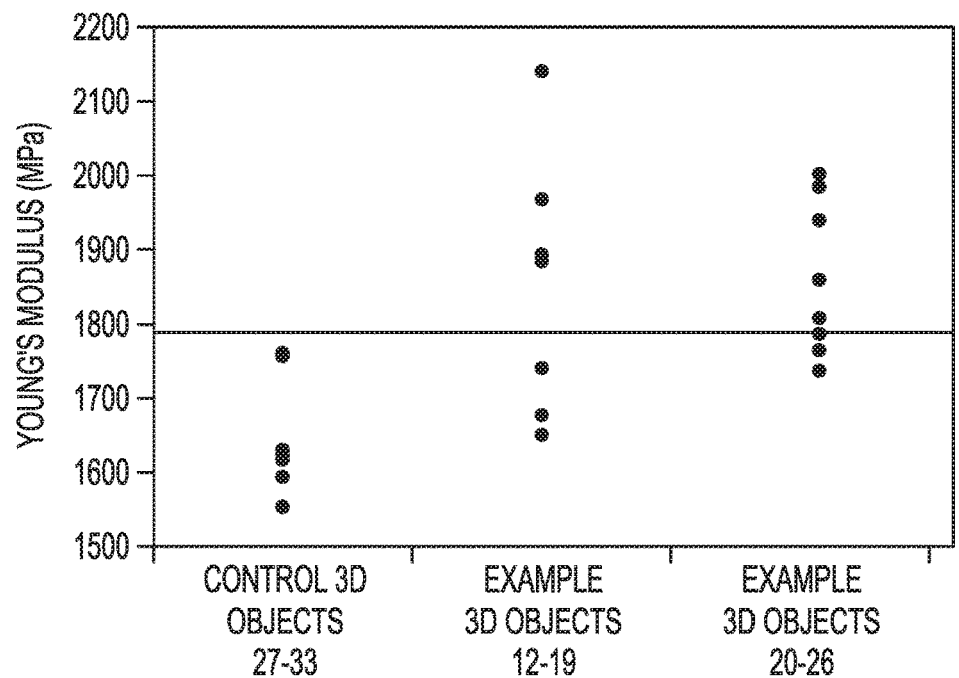
FIG. 3A is a graph depicting the Young's Modulus (Y axis, MPa) for control 3D printed objects, example 3D printed objects with 10 wt % of biodegradable polyester filler particles, and example 3D printed objects with 30 wt % of biodegradable polyester filler particles.
Figure 3B:
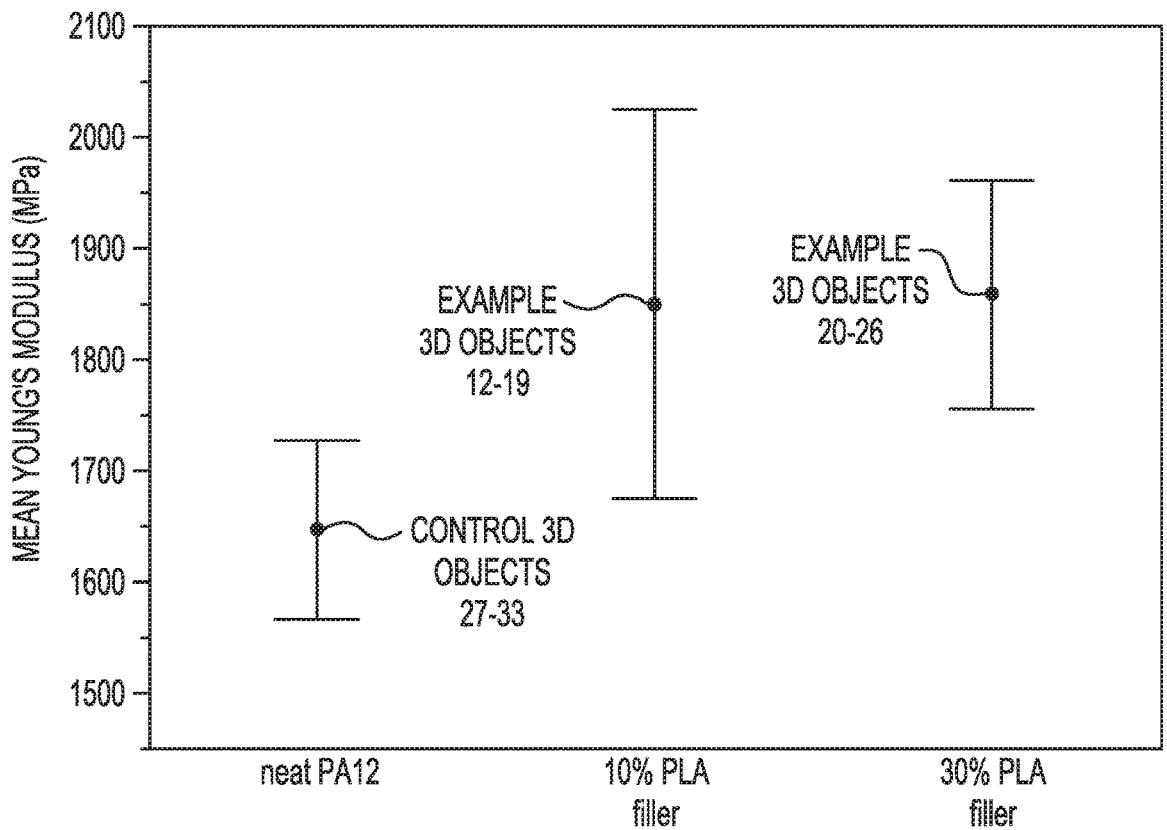
FIG. 3B is a graph depicting the mean Young's Modulus (Y axis, MPa) for the control 3D printed objects, the example 3D printed objects with 10 wt % of biodegradable polyester filler particles, and the example 3D printed objects with 30 wt % of biodegradable polyester filler particles.

The results for Young's Modulus for each of the example 3D objects 12-18 (including 10 wt % PLA filler), each of the example 3D objects 19-26 (including 30 wt % PLA filler), and each of the control 3D objects 27-33 are shown in graphical form in FIG. 3A. The mean Young's Modulus for example 3D objects 12-18 (including 10 wt % PLA filler), example 3D objects 19-26 (including 30 wt % PLA filler), and control 3D objects 27-33 are shown in FIG. 3B. Most of the example 3D objects including 10 wt % PLA filler (Ex. Dog Bones 12-14, 16, and 17) and the example 3D objects including 30 wt % PLA filler (Ex. Dog Bones 19, 20 and 22-26) exhibited an increase in Young's Modulus, indicating that both 10% and 30% PLA filler improves the stiffness relative to the control dog bones 27-33.

Figure 4:
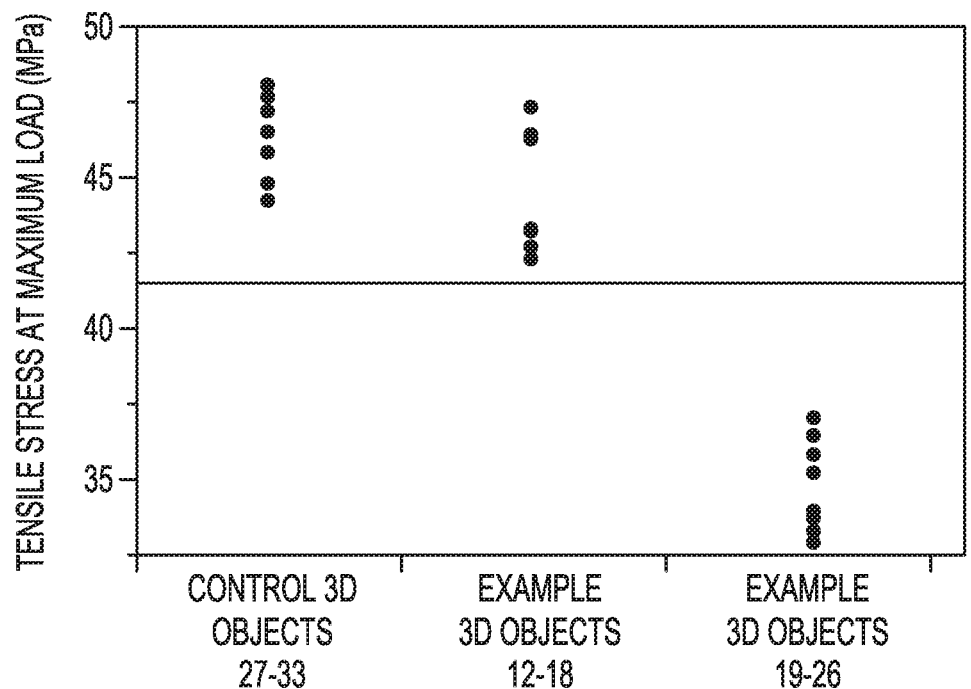
FIG. 4 is a graph depicting the tensile stress at maximum load (Y axis, MPa) for the control 3D printed objects, the example 3D printed objects with 10 wt % of biodegradable polyester filler particles, and the example 3D printed objects with 30 wt % of biodegradable polyester filler particles.

The results for tensile stress at maximum load for each of the example 3D objects 12-18 (including 10 wt % PLA filler), each of the example 3D objects 19-26 (including 30 wt % PLA filler), and each of the control 3D objects 27-33 are shown in graphical form in FIG. 4. The results for the example 3D objects 12-18 (including 10 wt % PLA filler) do not exhibit a significant drop in ultimate tensile strength relative to the control dog bones 27-33. The results for the example 3D objects 19-26 (including 30 wt % PLA filler) exhibited a more significant drop in ultimate tensile strength relative to the control dog bones 27-33, thus illustrating that 30 wt % or less of the PLA filler is desirable.

Figure 5:
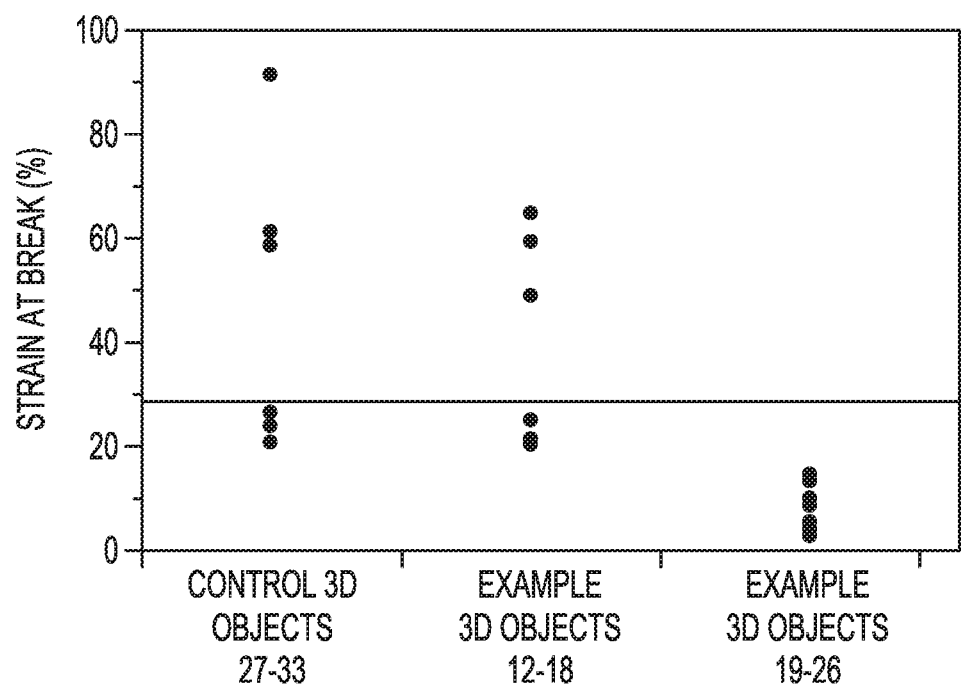
FIG. 5 is a graph depicting the strain at break (Y axis, %) for the control 3D printed objects, the example 3D printed objects with 10 wt % of biodegradable polyester filler particles, and the example 3D printed objects with 30 wt % of biodegradable polyester filler particles.

The results for % strain at break for each of the example 3D objects 12-18 (including 10 wt % PLA filler), each of the example 3D objects 19-26 (including 30 wt % PLA filler), and each of the control 3D objects 27-33 are shown in graphical form in FIG. 5. The results for the example 3D objects 12-18 (including 10 wt % PLA filler) do not exhibit a significant drop in % strain at break relative to the control dog bones 27-33. The results for the example 3D objects 19-26 (including 30 wt % PLA filler) exhibited a more significant drop in % strain at break relative to the control dog bones 27-33, thus illustrating that 30 wt % or less of the PLA filler is desirable.

Overall, the results in Examples 1 and 2 illustrate that the example build material compositions can be successfully 3D printed to generate objects with increased stiffness, ii) minimal increase in object weight, and iii) minimal reduction in strength relative to control objects (i.e., those with no filler). The results also illustrate that the biodegradable polyester filler particles improve stiffness without an undesirable weight increase that is observed, for example, when glass bead fillers are used.

Additional Notes

It is to be understood that the ranges provided herein include the stated range and any value or sub-range within the stated range, as if such values or sub-ranges were explicitly recited. For example, from about 5 wt % to about 30 wt % should be interpreted to include not only the explicitly recited limits of from about 5 wt % to about 30 wt %, but also to include individual values, such as about 8 wt %, 13 wt %, about 15.75 wt %, about 21 wt %, about 25.5 wt %, etc., and sub-ranges, such as from about 12 wt % to about 28 wt %, from about 10 wt % to about 23 wt %, from about 15 wt % to about 20 wt %, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. As an example, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) build material composition, consisting of:
    from about 70 wt % to about 95 wt % of polyamide particles, based upon a total weight of the build material composition; and
    from about 5 wt % to about 30 wt % of biodegradable polyester filler particles, based upon the total weight of the build material composition,
    wherein the 3D build material composition is dry.

2. The 3D build material composition as defined in claim 1 wherein the biodegradable polyester filler particles are selected from the group consisting of polylactic acid, polyglycolide, poly(DL-lactide-co-glycolide), polyethylene succinate, polybutylene succinate, polybutylene adipate, polybutylene succinate/adipate copolymer, polycaprolactone, and combinations thereof.

3. The 3D build material composition as defined in claim 1 wherein the polyamide particles are selected from the group consisting of polyamide-11, polyamide-12, polyamide-6, polyamide-8, polyamide-9, polyamide-66, polyamide-612, polyamide-812, polyamide-912, a thermoplastic polyamide, and combinations thereof.

4. A three-dimensional (3D) printing kit, comprising:
    a build material composition consisting of from about 70 wt % to about 95 wt % of polyamide particles and from about 5 wt % to about 30 wt % of biodegradable polyester filler particles, each based on a total weight of the build material composition, wherein the build material composition is dry; and
    a fusing agent including an energy absorber dissolved or dispersed in a liquid vehicle, wherein the energy absorber is selected from the group consisting of a near-infrared light absorbing colorant, an inorganic pigment, glass fibers, titanium dioxide, clay, mica, talc, barium sulfate, calcium carbonate, nitrocellulose, and combinations thereof.

5. The 3D printing kit as defined in claim 4 wherein:
    the polyamide particles are selected from the group consisting of polyamide-11, polyamide-12, polyamide-6, polyamide-8, polyamide-9, polyamide-66, polyamide-612, polyamide-812, polyamide-912, a thermoplastic polyamide, and combinations thereof; and
    the biodegradable polyester filler particles are selected from the group consisting of polylactic acid, polyglycolide, poly(DL-lactide-co-glycolide), polyethylene succinate, polybutylene succinate, polybutylene adipate, polybutylene succinate/adipate copolymer, polycaprolactone, and combinations thereof.

6. A three-dimensional printing method, comprising:
    spreading the build material composition of claim 1 to form a build material layer;
    based on a 3D object model, selectively applying a fusing agent on at least a portion of the build material layer, wherein the fusing agent includes an energy absorber selected from the group consisting of a near-infrared light absorbing colorant, an inorganic pigment, glass fibers, titanium dioxide, clay, mica, talc, barium sulfate, calcium carbonate, nitrocellulose, and combinations thereof; and
    exposing the build material layer to electromagnetic radiation to coalesce the build material composition in the at least the portion, thereby forming a layer of a 3D object.

7. The method as defined in claim 6, further comprising:
    iteratively applying individual build material layers of the build material composition;
    based on the 3D object model, selectively applying the fusing agent to at least some of the individual build material layers to define individually patterned layers; and
    iteratively exposing the individually patterned layers to the electromagnetic radiation to form individual object layers.

8. The method as defined in claim 6 wherein:
    the polyamide particles are selected from the group consisting of polyamide-11, polyamide-12, polyamide-6, polyamide-8, polyamide-9, polyamide-66, polyamide-612, polyamide-812, polyamide-912, a thermoplastic polyamide, and combinations thereof; and
    the biodegradable polyester filler particles are selected from the group consisting of polylactic acid, polyglycolide, poly(DL-lactide-co-glycolide), polyethylene succinate, polybutylene succinate, polybutylene adipate, polybutylene succinate/adipate copolymer, polycaprolactone, and combinations thereof.

9. The 3D build material composition as defined in claim 1 wherein the biodegradable polyester filler particles have an average particle size ranging from about 25 µm to about 245 µm.

10. The 3D build material composition as defined in claim 1 wherein the polyamide particles are polyamide-12 particles.

11. A three-dimensional (3D) build material composition, consisting of:
   polyamide build material particles;
   biodegradable polyester filler particles; and
   an additive selected from the group consisting of a flow aid, an antioxidant, an antistatic agent, a whitener, and combinations thereof, wherein:
      the flow aid is selected from the group consisting of aluminum oxide, powdered cellulose, magnesium stearate, sodium bicarbonate, sodium ferrocyanide, potassium ferrocyanide, calcium ferrocyanide, bone phosphate, sodium silicate, silicon dioxide, fused metal oxide, calcium silicate, magnesium trisilicate, talcum powder, sodium aluminosilicate, potassium aluminum silicate, calcium aluminosilicate, bentonite, aluminum silicate, stearic acid, and polydimethylsiloxane;
      the antioxidant is selected from the group consisting of a hindered phenol, a phosphite, and an organic sulfite;
      the antistatic agent is selected from the group consisting of an aliphatic amine, a quaternary ammonium salt, an ester of phosphoric acid, a polyethylene glycol ester, and a polyol; and
      the whitener is selected from the group consisting of titanium dioxide, zinc oxide, calcium carbonate, zirconium dioxide, aluminum oxide silicon dioxide, boron nitride, and combinations thereof.

12. A three-dimensional (3D) build material composition, consisting of:
   polyamide build material particles present in an amount ranging from about 70 wt % to about 90 wt %, based on a total weight of the 3D build material composition;
   biodegradable polyester filler particles present in an amount ranging from about 10 wt % to about 30 wt %, based on the total weight of the 3D build material composition; and
   an additive selected from the group consisting of a flow aid, an antioxidant, an antistatic agent, a whitener, and combinations thereof, wherein:
      the flow aid is selected from the group consisting of aluminum oxide, tricalcium phosphate, powdered cellulose, magnesium stearate, sodium bicarbonate, sodium ferrocyanide, potassium ferrocyanide, calcium ferrocyanide, bone phosphate, sodium silicate, silicon dioxide, fused metal oxide, calcium silicate, magnesium trisilicate, talcum powder, sodium aluminosilicate, potassium aluminum silicate, calcium aluminosilicate, bentonite, aluminum silicate, stearic acid, and polydimethylsiloxane;
      the antioxidant is selected from the group consisting of a hindered phenol, a phosphite, and an organic sulfite;
      the antistatic agent is selected from the group consisting of an aliphatic amine, a quaternary ammonium salt, an ester of phosphoric acid, a polyethlene glycol ester, and a polyol; and
      the whitener is selected from the group consisting of titanium dioxide, zinc oxide, calcium carbonate, zirconium dioxide, aluminum oxide silicon dioxide, boron nitride, and combinations thereof.

13. The 3D build material composition as defined in claim 11 wherein the polyamide build material particles are polyamide-12 particles.

14. The 3D build material composition as defined in claim 11 wherein the biodegradable polyester filler particles are selected from the group consisting of polylactic acid, polyglycolide, poly(DL-lactide-co-glycolide), polyethylene succinate, polybutylene succinate, polybutylene adipate, polybutylene succinate/adipate copolymer, polycaprolactone, and combinations thereof.

15. The 3D build material composition as defined in claim 11 wherein 3D build material composition is a dry blend of the polyamide build material particles, biodegradable polyester filler particles, and the additive.

* * * * *